Sept. 12, 1939.    J. L. BARR ET AL    2,172,693
STEERING ACCESSORY
Original Filed Dec. 7, 1933    3 Sheets-Sheet 1
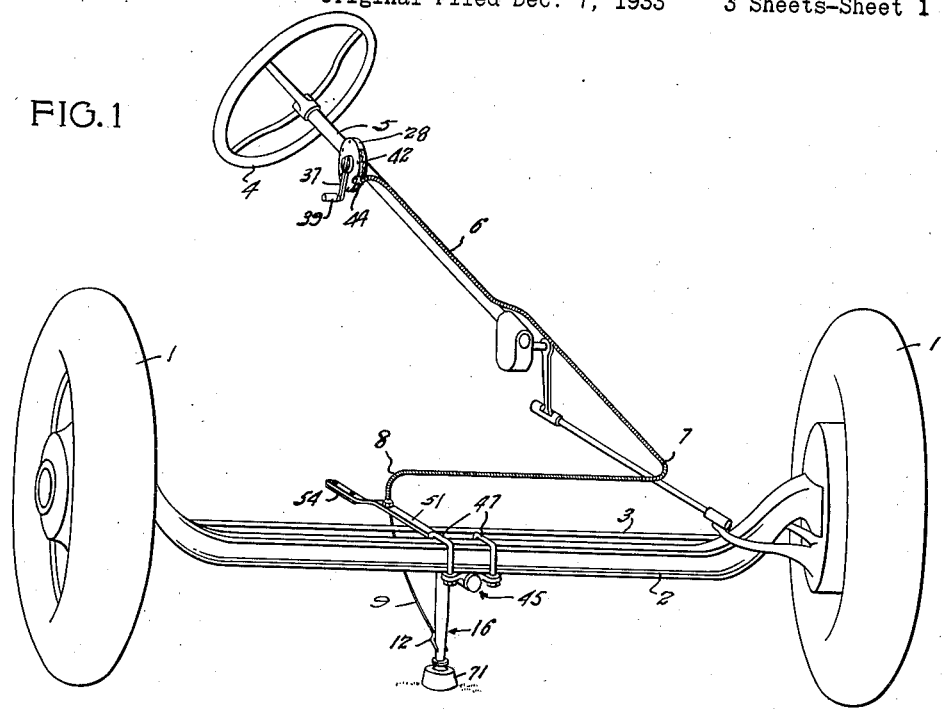
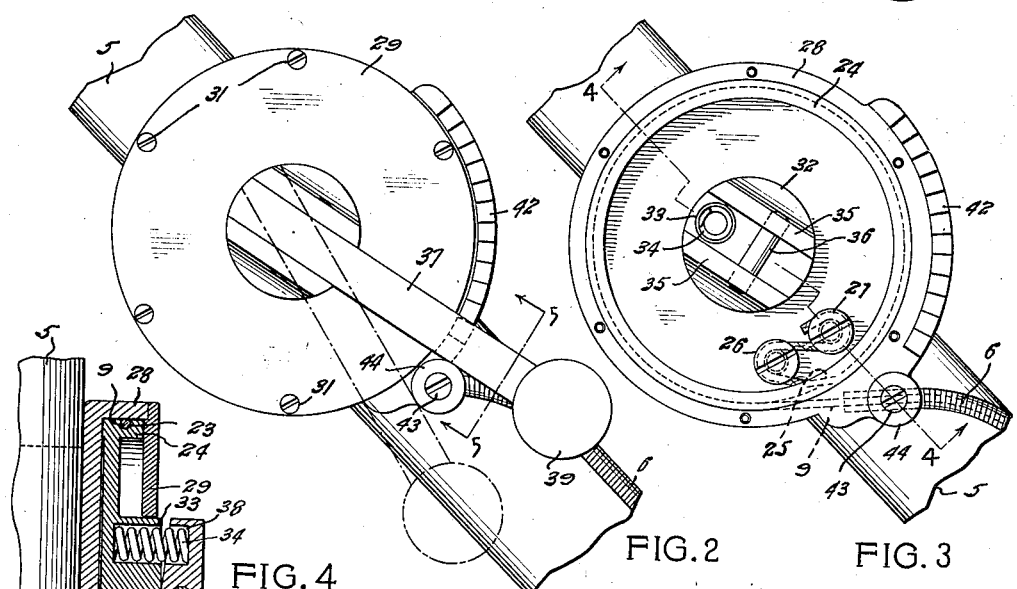
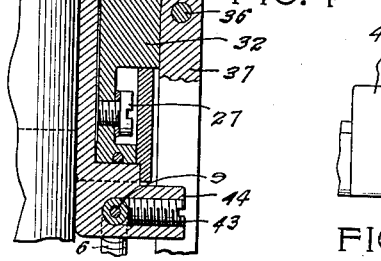
Inventors
JOHN L. BARR
& JAMES C HOUGHTON
By Semmes & Semmes
Attorneys

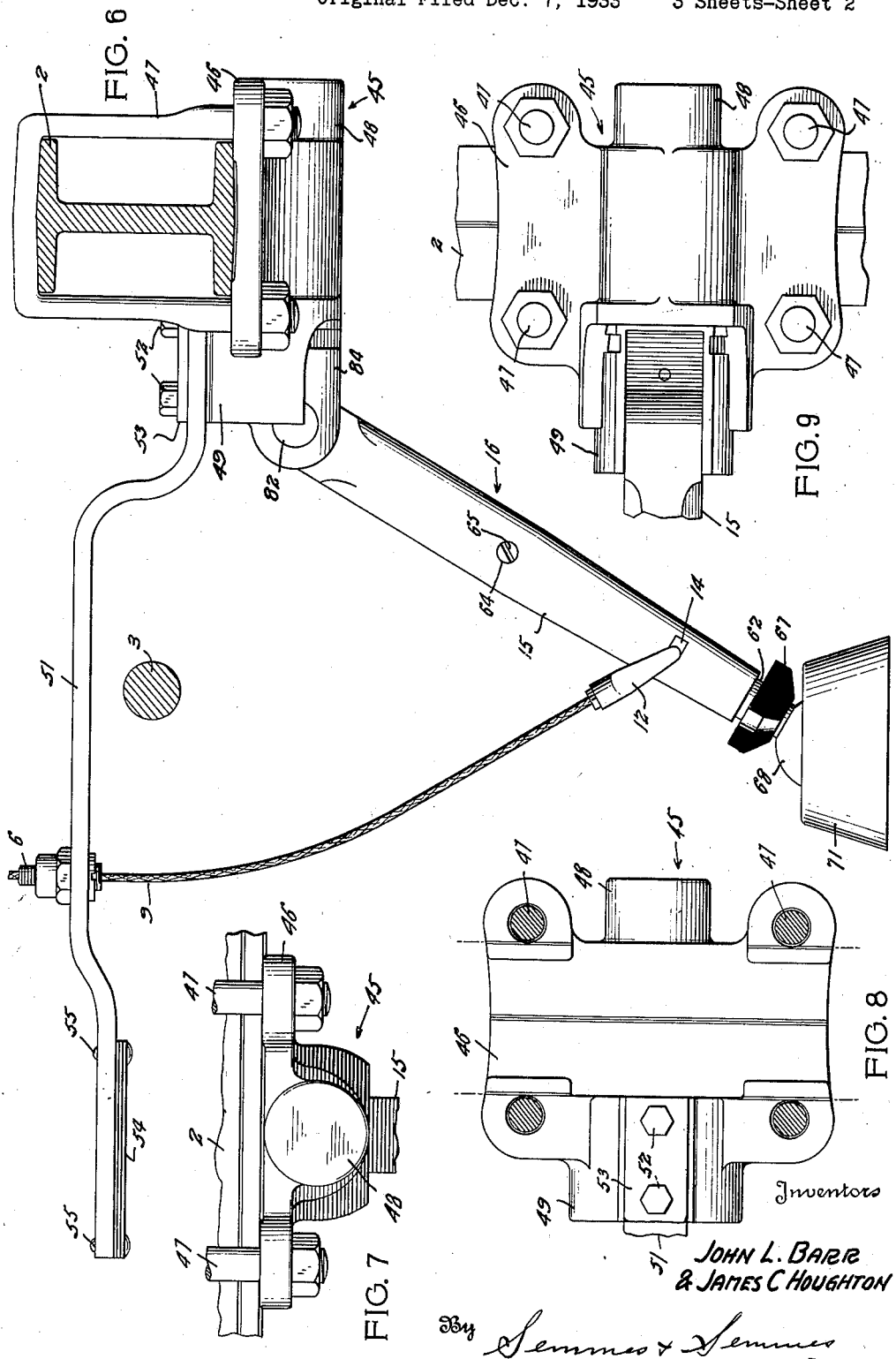

Sept. 12, 1939.  J. L. BARR ET AL  2,172,693
STEERING ACCESSORY
Original Filed Dec. 7, 1933  3 Sheets-Sheet 3
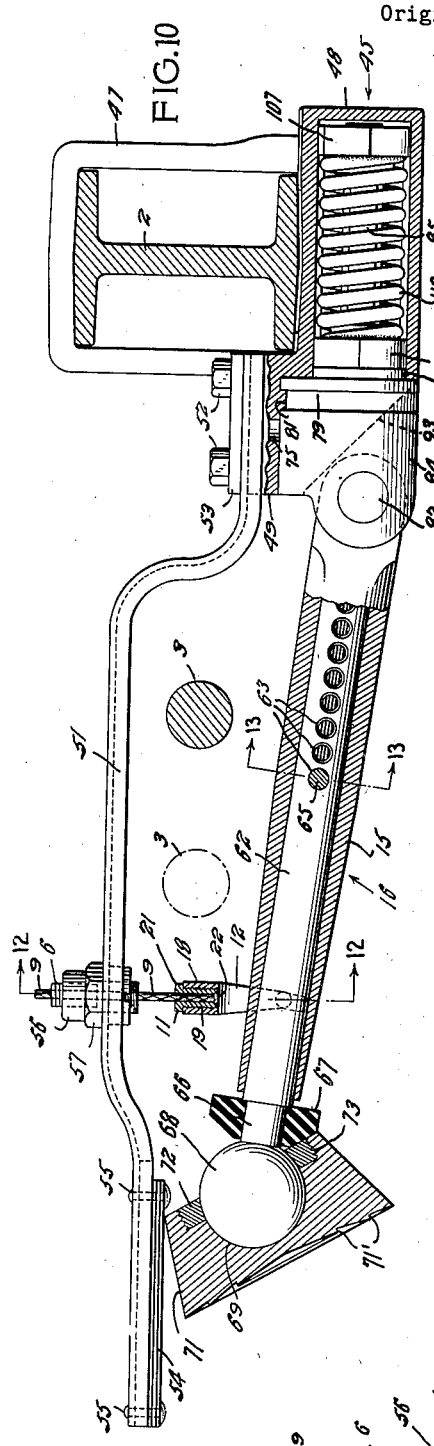
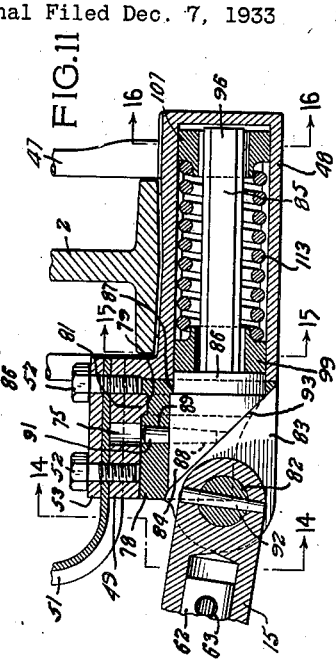
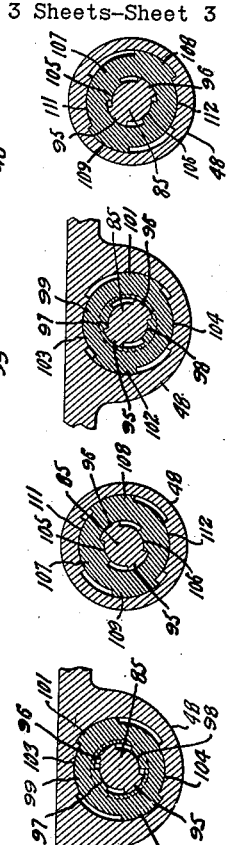
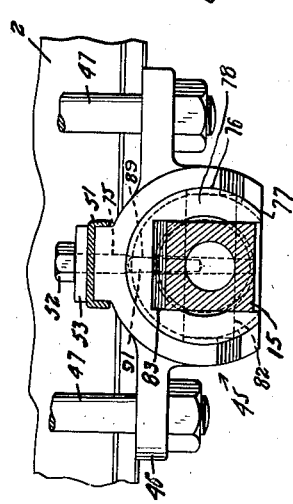
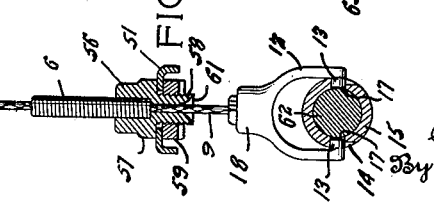
Inventors
JOHN L. BARR
& JAMES C. HOUGHTON
By Semmes and Semmes
Attorneys Patented Sept. 12, 1939

2,172,693

UNITED STATES PATENT OFFICE 2,172,693

STEERING ACCESSORY

John L. Barr, Chevy Chase, Md., and James C. Houghton, Washington, D. C., said Houghton assignor to said Barr Application December 7, 1933, Serial No. 701,394
Renewed June 10, 1937

11 Claims. (Cl. 280—150)

Our invention relates to a device for relieving at least part of the weight on at least one of the steering wheels of a vehicle so that the steering wheels may be more easily turned This application shows an improvement on our device shown in Patents 2,047,818, granted July 14, 1936, and 2,072,792, granted March 2, 1937

It is an object of this invention to provide a simple and sturdy means for bringing the compression element upon which the vehicle is raised into its most favorable operating position after each raising operation.

A further object of this invention is to provide a compression element which is readily adjustable in length Another object of this invention is to provide means for firmly yet flexibly retaining the compression element in a raised position without permitting rattling or noise or undue displacement of the element Still another object of the invention is to provide an improved means for supporting the compression element so that universal movement between the vehicle and the element is possible A still further object of the invention is to provide a device for readily adjusting the position of the compression element which may be easily and effectively operated from the driver's seat, and which is so constructed that the compression element may be held in any desired position Yet another object of our invention is to provide a means for supporting the compression element which will permit of a large road clearance.

With these and other objects in view, which may be incident to our improvements, the invention consists in the parts and combinations to be hereinafter set forth and claimed, with the understanding that the several necessary elements comprising our invention may be varied in construction, proportions and arrangement, without departing from the spirit and scope of the appended claims.

In order to make our invention more clearly understood, we have shown in the accompanying drawings means for carrying the same into practical effect without limiting the improvements in their useful applications to the particular constructions, which, for the purpose of explanation, have been made the subject of illustration.

In the drawings:

Figure 1 is a perspective view showing the application of our device to the front axle of an automobile;

Fig. 2 is a detailed side elevation of the winding reel;

Fig. 3 is a view similar to that of Figure 2, with the crank handle and cover plate removed from the winding mechanism;

Fig. 4 is a view taken along the line 4—4 of Figure 3, looking in the direction of the arrows;

Fig. 5 is a detail view taken along the line 5—5 of Figure 2, looking in the direction of the arrows;

Fig. 6 is a view in side elevation of the compression element and its attaching and supporting mechanism, the view being taken through the front axle;

Fig. 7 is a front elevational view of the support for the compression element on the car;

Fig. 8 is a top plan view of the support for the compression element on the car;

Fig. 9 is a bottom plan view of the support for the compression element on the car;

Fig. 10 is a side elevational view showing the compression element in the raised position with part of the mechanism shown in cross section;

Fig. 11 is a view partly in section showing the details of the support mechanism on the car for the compression element;

Fig. 12 is a view taken along the line 12—12 of Figure 10, looking in the direction of the arrows;

Fig. 13 is a sectional view taken along the line 13—13 of Figure 10, looking in the direction of the arrows;

Fig. 14 is a view taken along the line 14—14 of Figure 11, looking in the direction of the arrows;

Fig. 15 is a view taken along the line 15—15 of Figure 11, looking in the direction of the arrows;

Fig. 15a is a view taken along the line 15—15 of Figure 11, looking in the direction of the arrows when the hub upon which the compression element is pivoted has been rotated counter-clockwise;

Fig. 15b is a view taken along the line 15—15 of Figure 11, looking in the direction of the arrows when the rotation is in a clockwise direction;

Fig. 16 is a view taken along the line 16—16 of Figure 11, looking in the direction of the arrows;

Fig. 16a is a view taken along the line 16—16 of Figure 11, when the rotation of the hub is in the same direction as that shown in Figure 15a;

Fig. 16b is a view taken along the line 16—16 of Figure 11, looking in the direction of the arrows when the direction of rotation of the hub is the same as that indicated in Figure 15b.

Referring to the drawings, we have shown front wheels 1 of an automobile mounted on a front axle 2, which has the usual tie rod 3 and other steering construction, not shown. The automobile is provided with a steering wheel 4 and a steering wheel post 5 which, through suitable mechanism, operates to turn the front steering wheels 1.

On the steering post 5, and suitably attached thereto by means not shown, is a sheathing 6 for a Bowden wire construction which is bent, as indicated at 7 and 8, and carries within the sheath a Bowden wire 9. The end of the Bowden wire is attached by means of a suitable nut construction 11 (see Figure 10) to a stirrup or U-shaped member 12 which is provided with engaging lugs 13 that are adapted to fit in grooves 14 formed in the outer female member 15 of a compression element 16.

The lugs 13 are adapted to slide in the grooves 14 until they engage sockets 17 formed in the female member 15 of the compression element 16. The metal of the U-shaped element 12 is springy and permits the engaging lugs to be slid in the grooves 14 until they strike the socket 17. This construction gives a firm method of attaching the Bowden wire 9 to the compression element 16. The attachment is strong and yet permits pivoting, as will be apparent from an inspection of the drawings, particularly Figures 6 and 10. The U-shaped member 12 is provided with an upwardly extending neck 18, which is screw-threaded, as shown at 19. The Bowden wire 9 fits within a plug 21 which is provided with a nut 11, above referred to. The plug 21 is adapted to be screwed into the screw-threaded aperture 19 of the neck 18 and to hold the wire 9, whose end is engaged as shown at 22, firmly to the U-shaped element 12, see particularly Figures 10 and 12.

The wire 9, as is shown in Figures 4 and 3, is adapted to fit in a groove 23 formed in the periphery of a reel 24. The wire 9 passes through an aperture 25 in the periphery of the reel 24, and under a holding screw 26 and another holding screw 27, as can be particularly seen in Figures 3 and 4. The rotating member 24 fits within a casing 28 provided with a cover 29 that is held by screws 31. The reel is provided with a stub-shaft 32 which has an aperture 33 which acts as a well seat for a compression spring 34. The stub shaft 32 has upwardly projecting ears 35 through which pass a pivot pin 36 upon which is mounted a crank 37. The crank 37 is provided with a well spring aperture 38 which is adapted to receive an end of the spring 34. The construction is such that spring 34 normally holds the crank 37 in the position illustrated in Figure 4, but the crank 37 can be raised by reason of a hand hold 39 on the crank 37, and the crank 37 moved to desired positions by disengaging a pawl member 41 formed on the crank 37 from a ratchet construction 42 which is mounted on the side of the casing 28.

This permits the reel to be wound up to the desired point to tension the compression element against its anti-rattle spring cushioning means, to be later described, to the desired degree. With the part shown in dark line in Figure 2, the reel is fully wound up. While the cranks in the position shown in dotted lines in Figure 2, the reel is wholly released so that the compression element 16 is free to move either forward or backward to raise the front wheels of the car, dependng upon which side of the vertical the foot of the compression element first engages the ground.

It is to be understood that the compression element is normally adjusted to be of such length that under ordinary conditions the front wheels of the car, or at least one of them, is sufficiently raised to relieve the weight thereon to such an extent that the wheels may be more readily turned in difficult turning operations, such as occur in parking or unparking a car in confined spaces.

The covering 6 in which the Bowden wire 9 slides is held in place in the casing 28 of the reel by means of a screw 43 (see Figure 4). The casing is formed with a projecting portion 44 to house the screw. The projecting portion 44 acts as a stop for the motion of the crank 37 in either direction, as is apparent from an inspection of Figure 2.

The support for the compression element 16 on the vehicle comprises a casing 45 provided with flanges 46 (see Figure 9) which are bolted by means of U-bolts 47 to the front axle 2 of the car. The casing 45 is provided with a cylindrical member 48 and a support 49. The support 49 acts as a thrust bearing for taking strain imparted to the mechanism when the compression element is in operation to raise the car. An anti-rattle spring 51 is held to the support 49 by means of bolts 52 which bear against a plate 53 which lies on the top of the spring member 51. The spring member 51 is composed of spring channel steel, or other spring metal, and carries at its outer end a resilient pad of some material, such as rubber 54, which is fixed thereto by means of rivets 55. Passing through the spring 51 is a plug member 56 provided with underfaces 57. The plug member 56 has an extension 58 which has a central aperture through which passes the Bowden wire 9. The upper end of the plug has an enlarged aperture to receive the sheathing 6 for the Bowden wire 9.

The plug member 56 is held securely in place by means of a nut 59 which fits over a screw-threaded section of the extension 58 and holds the ensemble in place, as is plainly indicated in Figures 10 and 12. The end of the extension 58 is provided with a bell mouth, as shown at 61, so that the wire 9 will have free play without binding and can readily slide through the plug 56.

With the compression element 16 in the raised position, there is plenty of room for movement of the tie rod 3, the maximum movement of the tie rod being indicated by the dotted circle and shaded circle to which the numeral 3 has been applied, as shown in Figure 10.

The compression element 16 is formed with a male member 62 which is adapted to slide in an aperture formed in the female member 15. The male member 62 is provided with apertures 63. The female member has an aperture at 64. In the aperture 64 is adapted to fit a tapered screw 65. The screw 65 can be removed and the screw can be caused to enter any of the apertures 63 in the male member 62 of the compression element 16. The apertures 63 are tapered to fit the tapered screw 65, as indicated in Figures 10 and 13. The end of the screw 65 has threads 65' which engage threads formed in the female member 15 of the compression element 16 (see Figure 13). The screw in this drawing is shown as engaging the last aperture to the left of the series of apertures in the male member 62. Thus the length of the compression element 16 can be adjusted.

The male member 62 is provided with a reduced neck portion 66 around which is adapted to fit a conical shaped resilient pad of rubber, or similar material, 67. The neck 66 carries a ball 68 that fits within a socket aperture 69 formed in a ground engaging foot 71. The ball is held in place on the foot 71 by means of a plate 72 which is adapted to be screw-threaded, as indicated at 73, into the foot piece 71.

With the parts in the position shown in Figure 10, the Bowden wire has been reeled up by turning the handle 39 of the crank 37 in a clockwise direction, looking at the parts in the position in which they are shown in Figure 2. The pawl 41 has been moved to the position shown in Figure 5. This exerts a tension on Bowden wire 9 which pulls the compression element 16 firmly into the up position, such that the foot 71 bears against the rubber pad 54 of the spring 51. This forms an efficient anti-rattle mechanism that holds the parts resiliently yet firmly in place. Moreover, the conical rubber pad 67 bears against the top of the foot 71 and the foot 71 thus is in effect held between the rubber pad 67 and the pad 54 of the spring 51. The wire 9 is tensioned by the spring 51 and the whole assembly is held quietly and resiliently in place.

Ordinarily the pawl 41 would engage with the first or second tooth of the ratchet 42 when the leg is in the position shown in Figure 10. The remaining ratchet teeth are to provide take-up for stretch and slippage. The crank and attached pawl are shown in their extreme position, when all take-up had been utilized.

The foot 71 is formed with circular serrations 71' that tend to prevent slipping by presenting sharp edges to the roadway.

The support 49 of the casing is provided with an aperture 75 for a purpose which will be later described. The aperture 75 communicates with an arcuate aperture 76 in the casing 45 which is open at its bottom, as indicated at 77. The aperture 76 comprises a bearing seat for a hub member 78. The hub member 78 is provided with a keyway 79 which is adapted to fit around an annular key 81 formed in the support 49.

In assembly the hub 78 is rotated sideways and can then be fitted in place so that the keyway 79 in the hub fits the annular key 81. This assembly, as can be readily seen from Figures 10 and 11, comprises a thrust and radial bearing structure which permits considerable strain to be imposed through the compression leg without injury to the parts. The female member 15 of the compression leg is pivoted at 82 within a bifurcated recess 83 formed in the hub member 78. The enlarged end 84 of the splined shaft 85 is reduced in diameter at 86 so that there is a collar formed which contacts against a collar 87 formed on the hub 78. The enlarged end 84 is provided with a tapered aperture 88 corresponding with a tapered aperture 89 formed in the hub. A tapered pin 91 is dropped in the aperture 75 and locks the hub 78 and the enlarged end 84 together. A tapered pin 92 fits within apertures in the pivot 82 and in the end of the female member 15 of the compression element 16, locking the female element 15 to the pivot 82. It is to be noted that the aperture 83 has a sloped surface 93, see Figure 11, and dotted lines in Figure 10, which permits the compression element to be swung for a relatively large angle beyond the vertical in front of the car without binding.

The construction described permits two way pivoting of the compression element 16. The compression element 16 may pivot on the pivot 82 and it may pivot on the bearing surface between the hub 78 and the support 49. It will be noted that in the position of the parts shown in Figure 10, the foot 71 is drawn up so that it does not lie substantially below the lower extremity of the cylindrical member 48. This permits of large road clearance and the whole construction is such as to prevent substantial reduction of road clearance when employing the device on a car from that which ordinarily exists. This feature is noteworthy and is of considerable advantage on rough roads and in travel where road clearance becomes important.

In order to permit the device to operate at its greatest efficiency, it should be centered laterally after each operation in which the weight of the car is placed upon the compression element. This centering prevents un-uniform lift on each lifting operation because of lateral displacement of the compression element. Moreover, when the foot piece 71 first engages the ground it may rotate and laterally displace the compression element. It becomes important, therefore, to have some spring means which will tend to laterally center the compression element. This means I have located within a central bore provided in the cylindrical member 48. The assembly which accomplishes this result and its operation will be apparent from an inspection of Figures 11 and 15 to 16b inclusive.

Formed on the shaft 85 are splines 95 and 96. The splines 95 and 96 lie between abutments 97 and 98 formed on the interior of a cam piece 99. The cam piece 99 is provided with splines 101 and 102 which are adapted to contact against abutments 103 and 104 formed on the interior of the cylindrical member 48. This will all be apparent from an inspection of Figure 15.

In Figure 16 we have shown the assembly at the other end of the splined shaft 85. Here splines 95 and 96 bear against abutments 105 and 106 formed on the interior of the cam piece 107, which is provided with splines 108 and 109 which bear against abutments 111 and 112 which are continuations of abutments 103 and 104, respectively, and are formed on the interior of the cylindrical member 48.

There is provided a helical spring 113 which is suitably attached, as by electric welding, at either end to cam pieces 107 and 99. In assembling the device the spring is tensioned on the splined shaft 85 by relative movement between the cam pieces 99 and 107. When the degree of tension desired is effected, the cam pieces may be slipped into the position indicated in Figure 11. Here, looking at the parts in the position shown in Figure 15, the splines 96 and 95 of the splined shaft 85 bear against the abutments 97 and 98 of the cam member 99. The spring 113 is tensioning the cam member 99 in a counter-clockwise direction. At the other end of the assembly the splines 95 and 96 of the shaft 85 bear against abutments 105 and 106 of the cam piece 107. The spring 113 is tensioning the cam piece 107 in a clockwise direction.

It is to be noted that in the assembly, Figures 15 and 16, there is provided a slight clearance between the upper end of the spline 101 and abutment 103 and the lower end of spline 102 and abutment 104. Like clearances are provided at the other end of the device, as plainly apparent from an inspection of Figure 16. This permits the assembly to be readily shoved into place.

Now let us assume that the compression element 16 has been displaced laterally, for instance in such manner that the splined shaft 85 is moved in a counter-clockwise direction, looking at the parts in the positions shown in Figures 15a and 16a. The cam piece 99 is moved very slightly in a counter-clockwise direction so that there is a tight fit between the spline 102 and abutment 104, and spline 101 and abutment 103. The shaft 85, because it is moved in a counter-clockwise direction, no longer has its splines in contact with the abutments formed on the interior of the cam piece 99. At the other end of the assembly, however, the splines 95 and 96 formed in the splined shaft 85 have brought pressure against abutments 105 and 106 and have rotated the cam piece 107 in a counter-clockwise direction against the tension of the spring 113.

The tension of the spring 113 with the parts shown in the position indicated in Figures 16a and 15a tend to move the compression element 16 laterally back into its position of greatest efficiency, i. e., approximately laterally centered.

An exactly reverse process takes place when the rotation of the shaft 85 is in a clockwise manner. Here splines 95 and 96 engage abutments 97 and 98 of cam piece 99 and rotate cam piece 99 against the tension of the spring in a clockwise manner. At the other end of the assembly the tension of the spring forces the splines 109 and 108 into contact with abutments 111 and 112 while the splines 95 and 96 are freed from any contact with the abutments on the interior of the cam piece 107. Thus the spring is tensioned to center the compression element laterally.

It is to be noted that in this assembly the spring 113 exerts its tension in the same direction of rotation, i. e., by being coiled tighter, regardless of the direction of rotation of the splined shaft 85.

While we have shown and described the preferred embodiment of our invention, we wish it to be understood that we do not confine ourselves to the precise details of construction herein set forth, by way of illustration, as it is apparent that many changes and variations may be made therein, by those skilled in the art, without departing from the spirit of the invention, or exceeding the scope of the appended claims.

We claim:

1. In a device of the character described for lifting a vehicle to facilitate steering, a compression element, a rotatable member supporting the compression element, a pivot whose axis of rotation is at substantially right angles to the axis of rotation of the rotatable member for the upper part of the compression element located at the end of the rotatable member upon which the compression element is pivoted, and a bearing for the rotatable member supported by the vehicle.

2. In a device of the character described for lifting a vehicle to facilitate steering, a compression element supported by the vehicle, means to support the compression element comprising a hub on which the compression element is movably supported, a helical spring, a shaft around which the spring is wound turning with the hub, and connections between the shaft and the spring tending to tension the shaft in a pre-selected position of rotation.

3. In a device of the character described for lifting a vehicle to facilitate steering, a compression element supported by the vehicle, means to support the compression element comprising a hub on which the compression element is movably supported, a helical spring, a splined shaft turning with the hub, clutch members on the shaft attached to the spring, said clutch members operating under a spring tension tending to rotate the shaft back to a pre-selected position when displaced therefrom.

4. In a device of the character described for lifting a vehicle to facilitate steering, a compression element supported by the vehicle, means to support the compression element comprising a hub on which the compression element is movably supported, a helical spring, a splined shaft turning with the hub, clutch members on the shaft attached to the spring, one clutch member operating to tension the shaft for rotation in one direction, and the other in the opposite direction.

5. In a device of the character described for lifting a vehicle to facilitate steering, a compression element supported by the vehicle, means to support the compression element comprising a rotatable member in which the compression element is movably supported, a helical spring, a shaft around which the spring is wound turning with the rotatable member, and connections between the shaft and the spring tending to tension the shaft in a pre-selected position of rotation.

6. In a device of the character described for lifting a vehicle to facilitate steering, a compression element supported by the vehicle, a foot movably attached to the element, and a resilient mass supported by the element and adapted to engage the foot when it is moved beyond a predetermined position.

7. In a device of the character described for lifting a vehicle to facilitate steering, a compression element movably supported on the vehicle, a foot movably supported thereon, a resilient mass supported by the element and adapted to engage the foot when it is moved beyond a predetermined position, means to raise the element, and spring means against which the foot is held in tensioned relation.

8. In a device of the character described for lifting a vehicle to facilitate steering, a compression element movably supported on the vehicle, means to raise the element, a metallic spring member, and a resilient mass supported by the spring against which the element is held in tensioned relation.

9. A device of the character described for lifting a vehicle to facilitate steering, comprising a compression element supported on the vehicle, flexible means to raise the compression element operable from the driver's seat, and an attachment fitting between the means and the element comprising a U-shaped spring metal member, and engaging lugs supported thereon, said compression element being formed with guiding channels and seats to guide the lugs and retain them.

10. In a device of the character described, a compression element movably supported on a vehicle, a resilient member to engage said element when said element is moved to inoperative position, and means including a flexible cable to draw said element into inoperative position, a retaining sheath for said cable, one end of said cable being attached to said compression member and one end of said sheath being attached to said resilient member; whereby rubbing between said cable and said sheath during the coordinate movement of said compression member and said resilient member due to road shocks, is prevented.

11. In a device of the character described, a compression element movably supported on a front axle of a vehicle, said vehicle having a tie-rod running substantially parallel to and at some distance from said axle, an engaging element for said compression element extending above said tie-rod, and means to draw said compression element into contact with said engaging element, said contact being made at a point beyond said tie-rod.

JOHN L. BARR.
JAMES C. HOUGHTON.